March 12, 1968     H. R. CAMENZIND     3,373,356
HOLDING CURRENT METER FOR SCR OR THE LIKE
Filed March 23, 1966
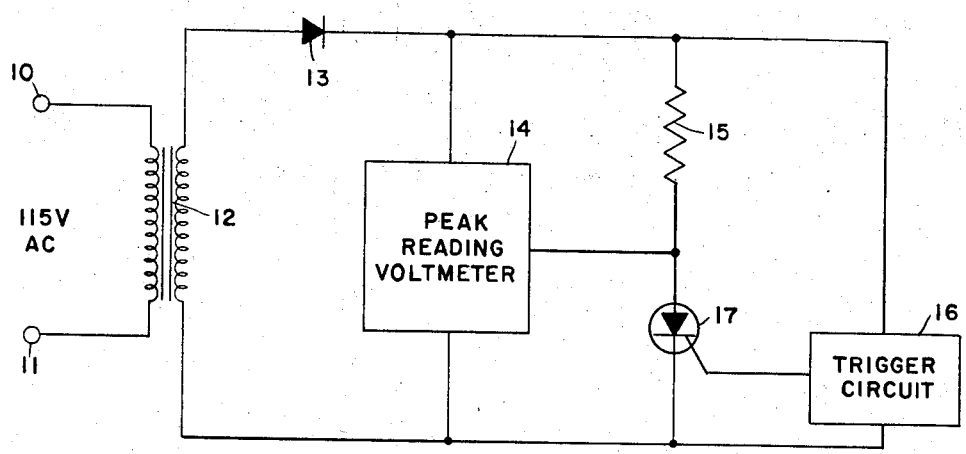
INVENTOR
HANS R. CAMENZIND
BY
ATTORNEY

United States Patent Office 3,373,356
Patented Mar. 12, 1968

3,373,356
HOLDING CURRENT METER FOR SCR OR THE LIKE
Hans R. Camenzind, Lexington, Mass., assignor to P. R. Mallory & Co. Inc., Indianapolis, Ind., a corporation of Delaware
Filed Mar. 23, 1966, Ser. No. 536,929
3 Claims. (Cl. 324—158)

ABSTRACT OF THE DISCLOSURE

Current from an AC source is supplied to an SCR having a know resistance connected to its anode. The SCR is triggered during positive half cycles of the AC wave. A peak-reading voltmeter is triggered by the rise in anode potential as the AC wave drops to the SCR holding current; the voltmeter remains triggered for the balance of the positive half-cycle. Holding current is computed from the peak voltage thus found and from the value of the known resistance.

---

The present invention relates to holding current meters and more particularly to the means and methods for providing a meter for measuring the holding current of a semiconductive device of the type having an anode electrode, a cathode electrode, and a gate electrode for controlling conduction from said anode electrode to said cathode electrode. The silicon controlled rectifier, now used widely in power control, voltage conversion, and switching applications, is typical of such devices and which will be discussed in detail in this specification.

A silicon controlled rectifier is a three-leaded device with characteristics similar to that of a gas-thyratron. That is, a current between the anode and cathode electrodes can be controlled with a third electrode, the gate. More specifically, a silicon controlled rectifier is a four layer semiconductor device with two main conducting terminals, the anode and cathode, and a gate or trigger terminal. A silicon controlled rectifier contains junctions that are intended to block all current flow in a reverse direction, block current flow in the forward direction under normal or ungated conditions, and allow forward current flow when the gate is energized or triggered.

The amount of anode current necessary to hold a silicon controlled rectifier in conduction is a very important parameter to the manufacturer of these devices as well as to the circuit designer.

At the present time, the holding current of a silicon controlled rectifier is measured by manually decreasing a direct current flowing through the silicon controlled rectifier in a conducting state. When the silicon controlled rectifier stops conducting, the current will suddenly drop to zero. However, it is very difficult to get a reliable reading of the holding current, i.e., the current flowing just prior to the sudden drop.

Accordingly, there is presented in this specification a meter for measuring the holding current of a silicon controlled rectifier with a high degree of accuracy. It is an attractive feature of the meter that no regulated direct current power supply is required. Also, the meter of the present invention will measure holding currents from 10 microamperes to 1 ampere with an accuracy better than ±2%.

It is an object of the present invention therefore, to provide a meter for accurately and efficiently measuring the holding current of a semiconductive device.

It is another object of the present invention to provide a meter for measuring the holding current of a semiconductive device, said meter being powered by a half-wave power source.

It is a further object of the present invention to provide a meter for measuring the holding current of a silicon controlled rectifier which is triggered into conduction by a pulse provided to the gate electrode of said silicon controlled rectifier when the voltage source for said meter presents a predetermined voltage to the anode of said silicon controlled rectifier.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

The single figure is a schematic of the silicon controlled rectifier holding current meter of the present invention.

Generally speaking, the present invention is a meter for measuring the holding current of a semiconductive device of the type having an anode electrode, a cathode electrode, and a gate electrode for controlling conduction from said anode electrode to said cathode electrode, said meter comprising: a voltage source; a device to be tested connected in circuit with a resistor across said voltage source, said device to be tested having an anode electrode, gate electrode, and cathode electrode; a means for switching said device to be tested into conduction when a predetermined voltage is presented by said voltage source to said anode electrode, said means for switching being connected to said gate electrode and in circuit with said voltage source; a peak reading voltmeter for measuring the voltage on said anode electrode when said device to be tested stops conducting, said peak reading voltmeter being connected across said resistor and said device to be tested; and a circuit means for connecting said anode electrode to said peak reading voltmeter so as to trigger said voltmeter when said device to be tested stops conducting.

Referring now to the drawing, and particularly to the schematic of the figure, the components and circuitry of the present invention can be visualized in conjunction with the following description.

The 115 VAC supply is provided across the terminals 10 and 11. There is an input transformer 12 having its primary winding coupled across the terminals 10 and 11. A diode 13 and a peak reading voltmeter 14 are connected in series across the secondary winding of the transformer 12. The resistor 15 and the silicon controlled rectifier 17 to be tested are connected in series with the diode 13 across the secondary winding of the transformer 12. A trigger circuit 16 is connected to the gate of the silicon controlled rectifier 17. There is a circuit means for connecting the anode of the silicon controlled rectifier 17 to the peak reading voltmeter 14.

With the above description of circuitry in mind, and by making reference to the schematic of the figure, the following analysis of operation will serve to convey the functional details of the meter of the present invention.

Half-wave current is applied to the silicon controlled rectifier 17 via the diode 13 and the resistor 15. The trigger circuit 16 switches the silicon controlled rectifier 17 on at the peak of the half-wave. A steadily decreasing current then flows through the resistor 15 into the anode of the silicon controlled rectifier 17. At a certain level the silicon controlled rectifier 17 will switch off and the anode voltage will immediately assume the potential of the voltage applied through the diode 13. (This level is referred to as the holding current for the silicon controlled rectifier.) The rise of the anode voltage is used to trigger the peak reading voltmeter 14. The voltmeter remains triggered until at or near the end of the half-cycle, at which point it turns off until it is again triggered by the rise in anode potential occurring during the succeeding half-cycle. The voltage indicated on the peak reading voltmeter 14 divided by the value of the resistor 15 is the holding current for the silicon controlled rectifier 17 under test.

The accuracy of the indication, therefore, depends only on the tolerance of the resistor 15 and the peak reading voltmeter 14.

The illustrative embodiment of this specification has been built and tested and is capable of measuring holding currents from 10 microamperes to 1 ampere with an accuracy of better than ±2%.

The trigger circuit 16 is a means for switching on the silicon controlled rectifier 17 at the peak of the half-wave supplied to the device to be tested. The trigger circuit 16 could be a relaxation-oscillator timing circuit for performing the abovementioned function. Other triggering circuits can readily be developed by those skilled in the art.

The holding current meter of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interpreted as illustrative and not in a limiting sense.

What is claimed is:

1. A meter for measuring the holding current of a semiconductive device of the type having anode and cathode electrodes and a gate electrode for controlling conduction between said anode and cathode, said meter comprising: an AC voltage source connected to the cathode of said device and to a known resistance, said resistance being further connected to the anode of said device; a means connected across said voltage source and connected to the gate of said device, said means being operable to switch said device into conduction at a predetermined voltage existing across said voltage source; a peak-reading voltmeter for measuring the voltage between said anode and cathode at which voltage said device ceases to conduct; and a circuit means for connecting said anode to said voltmeter so as to trigger said voltmeter when said device ceases to conduct.

2. A meter as in claim 1 wherein said voltage source comprises a transformer coupled to an alternating current and a rectifying diode connected to said transformer, so as to provide half-wave current to said device.

3. A meter as in claim 2 wherein said means for switching said device into conduction provides a triggering pulse to the gate of said device substantially at the peak of said half-wave current.

No references cited.

RUDOLPH V. ROLINEC, *Primary Examiner.*

E. L. STOLARUN, *Assistant Examiner.*